United States Patent
Chai et al.

(10) Patent No.: US 10,707,025 B2
(45) Date of Patent: Jul. 7, 2020

(54) INTERNAL HYBRID ELECTROCHEMICAL ENERGY STORAGE CELL HAVING BOTH HIGH POWER AND HIGH ENERGY DENSITY

(71) Applicant: Nanotek Instruments, Inc., Dayton, OH (US)

(72) Inventors: Songhai Chai, Centerville, OH (US); Aruna Zhamu, Springboro, OH (US); Bor Z. Jang, Centerville, OH (US)

(73) Assignee: Nanotek Instruments Group, LLC, Dayton, OH (US)

( * ) Notice: Subject to any disclaimer, the term of this patent is extended or adjusted under 35 U.S.C. 154(b) by 52 days.

(21) Appl. No.: 15/724,892

(22) Filed: Oct. 4, 2017

(65) Prior Publication Data

US 2019/0103232 A1  Apr. 4, 2019

(51) Int. Cl.
*H01G 11/06* (2013.01)
*H01M 4/38* (2006.01)
(Continued)

(52) U.S. Cl.
CPC ............ *H01G 11/06* (2013.01); *C01B 32/10* (2017.08); *C01B 32/192* (2017.08); *C01B 32/198* (2017.08); *C01B 32/225* (2017.08); *H01G 11/26* (2013.01); *H01G 11/34* (2013.01); *H01G 11/36* (2013.01); *H01G 11/48* (2013.01); *H01G 11/50* (2013.01); *H01G 11/86* (2013.01); *H01M 4/386* (2013.01); *H01M 4/48* (2013.01); *H01M 12/005* (2013.01); *B82Y 30/00* (2013.01); *B82Y 40/00* (2013.01); *C01B 2204/02* (2013.01);
(Continued)

(58) Field of Classification Search
None
See application file for complete search history.

(56) References Cited

U.S. PATENT DOCUMENTS 9,564,656 B1  2/2017  Zhamu et al.
2009/0059474 A1  3/2009  Zhamu et al.
(Continued)

FOREIGN PATENT DOCUMENTS

WO  2017095512 A1  6/2017

OTHER PUBLICATIONS

Jahan et al., "Electrocatalytically Active Graphene-Porphyrin MOF Composite for Oxygen Reduction Reaction" Journal of the American Chemical Society (2012) vol. 134, pp. 6707-6713.
(Continued)

*Primary Examiner* — Lucas J. O'Donnell

(57) ABSTRACT

Provided is an internal hybrid electrochemical cell comprising: (A) a pseudocapacitance cathode comprising a cathode active material that contains both graphene sheets and a porphyrin complex, wherein said porphyrin complex is bonded to or supported by primary surfaces of said graphene sheets to form a redox pair for pseudocapacitance; (B) a battery-like anode comprising lithium metal, lithium metal alloy, or a prelithiated anode active material (e.g. prelithiated Si, SiO, Sn, $SnO_2$, etc.), and (C) a lithium-containing electrolyte in physical contact with the anode and the cathode; wherein the cathode active material has a specific surface area no less than 100 $m^2/g$ which is in direct physical contact with the electrolyte.

22 Claims, 12 Drawing Sheets

(51) Int. Cl.

| | | |
|---|---|---|
| *H01M 4/48* | (2010.01) | |
| *H01G 11/48* | (2013.01) | |
| *H01G 11/50* | (2013.01) | |
| *H01G 11/26* | (2013.01) | |
| *H01G 11/36* | (2013.01) | |
| *H01G 11/34* | (2013.01) | |
| *H01G 11/86* | (2013.01) | |
| *C01B 32/198* | (2017.01) | |
| *C01B 32/192* | (2017.01) | |
| *C01B 32/10* | (2017.01) | |
| *H01M 12/00* | (2006.01) | |
| *C01B 32/225* | (2017.01) | |
| *H01M 4/02* | (2006.01) | |
| *H01G 11/56* | (2013.01) | |
| *H01G 11/62* | (2013.01) | |
| *B82Y 40/00* | (2011.01) | |
| *B82Y 30/00* | (2011.01) | |

(52) U.S. Cl.
CPC ...... *C01B 2204/22* (2013.01); *C01P 2006/40* (2013.01); *H01G 11/56* (2013.01); *H01G 11/62* (2013.01); *H01M 2004/027* (2013.01); *Y10S 977/734* (2013.01); *Y10S 977/842* (2013.01); *Y10S 977/948* (2013.01)

(56) References Cited

U.S. PATENT DOCUMENTS

| | | |
|---|---|---|
| 2012/0295096 A1 | 11/2012 | Liu et al. |
| 2013/0171502 A1 | 7/2013 | Chen et al. |
| 2013/0271085 A1* | 10/2013 | Chen .................. H01M 4/0445 320/132 |
| 2014/0042390 A1 | 2/2014 | Gruner et al. |

OTHER PUBLICATIONS

PCT/US18/53728 International Search Report and Written Opinion dated May 1, 2019, 16 pages.
Yamuna et al., "Synthesis, characterization, and nonlinear optical properties of graphene oxide functionalizd with tetra-amino porphyrin" Journal of Nanoparticle Research (2013) vol. 15, pp. 1-9.
Adler, et al., "A simplified synthesis for meso-tetraphenylporphine" J. Org. Chem. (1967) vol. 32, No. 2, pp. 476-476.
Falvo et al., "Microscale Synthesis and 1H NMR Analysis of Tetraphenylporphyrins" J. Chem. Educ. (1999) vol. 76, pp. 237-239.
Gao et al., "A Porphyrin Complex as a Self-Conditioned Electrode Material for High-Performance Energy Storage" Angewandte Chemie (2017) vol. 129, No. 35, pp. 10477-10482.
Karlicky et al., "Halogenated Graphenes: Rapidly Growing Family of Graphene Derivatives" ACS Nano (2013) vol. 7, No. 8, pp. 6434-6464.
Petit et al., "Microwave Irradiation in Dry Media: A New and Easy Method for Synthesis of Tetrapyrrolic Compounds" Synth. Commun. (1992) vol. 22, No. 8, pp. 1137-1142.
Rothemund, "A New Porphyrin Synthesis" J. Am. Chem. Soc. (1936) vol. 58, No. 4, pp. 625-627.
Rothemund, "Formation of Porphyrins from Pyrrole and Aldehydes" J. Am. Chem. Soc. (1935) vol. 57, No. 10, pp. 2010-2011.
Shinokubo, Angew. Chem. (2013), vol. 125, p. 1400 (doi: 10.1002/ange.201207020).
U.S. Appl. No. 15/727,900 Nonfinal Office Action dated Jun. 13, 2019, 6 pages.
U.S. Appl. No. 15/728,488 Final Office Action dated Dec. 2, 2019, 20 pages.
U.S. Appl. No. 15/728,488 Nonfinal Office Action dated Aug. 6, 2019, 16 pages.

* cited by examiner meso positions* meso-substituted porphyrin beta positions (asterisks*)

beta-substituted porphyrin

Ph = phenol group

INTERNAL HYBRID ELECTROCHEMICAL ENERGY STORAGE CELL HAVING BOTH HIGH POWER AND HIGH ENERGY DENSITY

FIELD OF THE INVENTION

This invention relates generally to the field of electrochemical energy storage devices and, more particularly, to a fundamentally new internal hybrid battery/pseudocapacitor cell featuring a battery-like anode and a pseudocapacitor-like cathode.

BACKGROUND OF THE INVENTION

Supercapacitors (Ultra-capacitors or Electro-chemical Capacitors):

A supercapacitor normally depends on porous carbon electrodes to create a large surface area conducive to the formation of diffuse electric double layer (EDL) charges. The ionic species (cations and anions) in the EDL zones are formed in the electrolyte near an electrode surface when voltage is imposed upon a symmetric supercapacitor (or EDLC). The required ions for this EDL mechanism pre-exist in the liquid electrolyte (randomly distributed in the electrolyte) when the cell is made or in a discharged state.

When the supercapacitor is re-charged, the ions (both cations and anions) already pre-existing in the liquid electrolyte are formed into EDLs near their respective local electrodes. There is no exchange of ions between an anode active material and a cathode active material. The amount of charges that can be stored (capacitance) is dictated solely by the concentrations of cations and anions that pre-exist in the electrolyte. These concentrations are typically very low and are limited by the solubility of a salt in a solvent, resulting in a low energy density.

Since the formation of EDLs does not involve a chemical reaction or an exchange of ions between the two opposite electrodes, the charge or discharge process of an EDL supercapacitor can be very fast, typically in seconds, resulting in a very high power density (more typically 3,000-8,000 W/Kg). Compared with batteries, supercapacitors offer a higher power density, require no maintenance, offer a much higher cycle-life, require a very simple charging circuit, and are generally much safer. Physical, rather than chemical, energy storage is the key reason for their safe operation and extraordinarily high cycle-life.

Another type of supercapacitor is a pseudocapacitor that stores electrical energy by means of reversible faradaic redox reactions on the surface of suitable carbon electrodes. Such an electrode typically is composed of a carbon material (e.g. activated carbon) and a transition metal oxide (or a conjugate polymer), which together form a redox pair. Pseudocapacitance is typically accompanied with an electron charge-transfer between electrolyte and electrode arising from a de-solvated and adsorbed ion whereby only one electron per charge unit participates. This faradaic charge transfer originates from a very fast sequence of reversible redox, intercalation or electrosorption processes. The adsorbed ion has no chemical reaction with the atoms of the electrode (no chemical bonding) since only a charge-transfer occurs.

Despite the positive attributes of supercapacitors, there are several technological barriers to widespread implementation of supercapacitors for various industrial applications. For instance, EDLC supercapacitors possess very low energy densities when compared to batteries (e.g., 5-8 Wh/kg for commercial supercapacitors vs. 20-40 Wh/Kg for the lead acid battery and 50-100 Wh/kg for the NiMH battery). Although a pseudocapacitor can exhibit a higher specific capacitance or energy density relative to the EDLC, the energy density per cell is typically lower than 20 Wh/kg. The conventional pseudocapacitor also suffers from a poor cycle life. Lithium-ion batteries possess a much higher energy density, typically in the range of 150-220 Wh/kg, based on the total cell weight.

Lithium-Ion Batteries (LIB):

Although possessing a much higher energy density, lithium-ion batteries deliver a very low power density (typically 100-500 W/Kg), requiring typically hours for re-charge. Conventional lithium-ion batteries also pose some safety concern.

The low power density or long re-charge time of a lithium ion battery is due to the mechanism of shuttling lithium ions between the interior of an anode and the interior of a cathode. During recharge, lithium atoms must diffuse out of a cathode active material (e.g. particles of $LiCoO_2$), migrate through an electrolyte phase, and enters or intercalates into the bulk of an anode active material particles (e.g. graphite particles). Most of these lithium ions have to come all the way from the cathode side by diffusing out of the bulk of a cathode active particle, through the pores of a solid separator (pores being filled with a liquid electrolyte), and into the bulk of a graphite particle at the anode.

During discharge, lithium ions diffuse out of the anode active material (e.g. de-intercalate out of graphite particles 10 µm in diameter), migrate through the liquid electrolyte phase, and then diffuse into the bulk of complex cathode crystals (e.g. intercalate into particles lithium cobalt oxide, lithium iron phosphate, or other lithium insertion compound). Because the liquid electrolyte only reaches the external surface (not interior) of a solid particle (e.g. graphite particle), lithium ions swimming in the liquid electrolyte can only migrate (via fast liquid-state diffusion) to the surface of a graphite particle. To penetrate into the bulk of a solid graphite particle would require a slow solid-state diffusion (commonly referred to as "intercalation") of lithium ions. The diffusion coefficients of lithium in solid particles of lithium metal oxide are relatively low; e.g. typically $10^{-16}$-$10^{-8}$ cm$^2$/sec (more typically $10^{14}$-$10^{-10}$ cm$^2$/sec), although those of lithium in liquid are approximately $10^{-6}$ cm$^2$/sec.

As such, these intercalation or solid-state diffusion processes require a long time to accomplish because solid-state diffusion (or diffusion inside a solid) is difficult and slow. This is why, for instance, the current lithium-ion battery for plug-in hybrid vehicles requires 2-7 hours of recharge time, as opposed to just seconds for supercapacitors. The above discussion suggests that an energy storage device that is capable of storing as much energy as in a battery and yet can be fully recharged in one or two minutes like a supercapacitor would be considered a revolutionary advancement in energy storage technology.

Lithium Ion Capacitors (LIC):

A hybrid energy storage device that is developed for the purpose of combining some features of an EDL supercapacitor (or symmetric supercapacitor) and those of a lithium-ion battery (LIB) is a lithium-ion capacitor (LIC). A LIC contains a lithium intercalation compound (e.g., graphite particles) as an anode and an EDL capacitor-type cathode (e.g. activated carbon, AC). In a commonly used LIC, $LiPF_6$ is used as an electrolyte salt, which is dissolved in a solvent, such as propylene carbonate. When the LIC is in a charged state, lithium ions are retained in the interior of the lithium intercalation compound anode (i.e. micron-scaled graphite particles) and their counter-ions (e.g. negatively charged $PF_6^-$) are disposed near activated carbon surfaces.

When the LIC is discharged, lithium ions migrate out from the interior of graphite particles (a slow solid-state diffusion process) to enter the electrolyte phase and, concurrently, the counter-ions $PF_6^-$ are also released from the EDL zone, moving further away from AC surfaces into the bulk of the electrolyte. In other words, both the cations ($Li^+$ ions) and the anions ($PF_6^-$) are randomly disposed in the liquid electrolyte, not associated with any electrode. This implies that the amounts of both the cations and the anions that dictate the specific capacitance of a LIC are essentially limited by the solubility limit of the lithium salt in a solvent (i.e. limited by the amount of $LiPF_6$ that can be dissolved in the solvent) and the surface area of activated carbon in the cathode. Therefore, the energy density of LICs (a maximum of 14 Wh/kg) is not much higher than that (6 Wh/kg) of an EDLC (symmetric supercapacitor), and remains an order of magnitude lower than that (most typically 150-220 Wh/kg) of a LIB.

Furthermore, due to the need to undergo de-intercalation and intercalation at the anode, the power density of a LIC is not high (typically <12 kW/kg, which is comparable to or only slightly higher than those of an EDLC).

The above review of the prior art indicates that a battery has a higher energy density, but is incapable of delivering a high power (high currents or pulsed power) that an EV, HEV, or micro-EV needs for start-stop and accelerating. A battery alone is also not capable of capturing and storing the braking energy of a vehicle. A supercapacitor or LIC can deliver a higher power, but does not store much energy (the stored energy only lasts for a short duration of operating time) and, hence, cannot be a single power source alone to meet the energy/power needs of an EV or HEV. Thus, there is an urgent need for an electrochemical energy storage device that delivers both a high energy density and a high power density.

SUMMARY OF THE INVENTION

The present invention provides an internal hybrid electrochemical cell comprising:
(A) a cathode comprising a cathode active material that contains both graphene sheets and a porphyrin compound (porphyrin or a porphyrin complex) wherein the porphyrin compound is bonded to or supported by primary surfaces (not the edge faces) of the graphene sheets to form a redox pair for pseudocapacitance (the porphyrin compound and the graphene sheets, when intimately contacted together, form a redox pair capable of providing large amounts of pseudocapacitance);
(B) a battery-like anode comprising lithium metal, a lithium metal alloy, or a prelithiated anode active material selected from the group consisting of (a) lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) lithiated alloys or intermetallic compounds of Si, Ge, Sn, Pb, Sb, Bi, Zn, Al, Ti, Co, Ni, Mn, Cd, and their mixtures; (c) lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof (e.g. including lithiated SiO, lithiated $ZnMn_2O_4$, etc.); (d) lithiated graphite and carbon materials; and (e) combinations thereof; and (C) a lithium-containing electrolyte in physical contact with the anode and the cathode; wherein the cathode active material has a specific surface area no less than 100 $m^2/g$ (preferably >500 $m^2/g$, more preferably >700 $m^2/g$, and most preferably >1000 $m^2/g$) which is in direct physical contact with the electrolyte. There can be a porous separator disposed between the anode and the cathode.

In certain embodiments, the porphyrin compound is selected from a porphyrin-transition metal compound. The porphyrin complex is preferably selected from porphyrin-copper, porphyrin-zinc, porphyrin-nickel, porphyrin-cobalt, porphyrin-manganese, porphyrin-iron, porphyrin-tin, porphyrin-cadmium, porphyrin-vanadium, polyporphyrin, a functionalized porphyrin compound, or a combination thereof.

The porphyrin compounds are a group of heterocyclic macrocycle organic compounds, composed of four modified pyrrole subunits interconnected at their α carbon atoms via methine bridges (=CH—). The parent porphyrin is porphin, and substituted porphines are called porphyrins. The porphyrin ring structure is aromatic, with a total of 26 electrons in the conjugated system.

The center of the porphyrin can be empty (FIG. 3(A)) or holds a metal ion (e.g. denoted as M in FIG. 3(D)). The porphyrin center can be "coordinated" with a wide array of transition metal elements. For instance, M can be V, Cr, Mn, Fe, Co, Ni, Cu, Zn, Sn, In, etc. Different functional groups can be attached to one or more sides of the porphyrin molecule.

The functional chemical group in porphyrin compound may be selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—) OR', R'—R", R'—N—CO, (C$_2$H$_4$O—)$_w$H, (C$_3$H$_6$O—)$_w$—R', (—C$_2$H$_4$O)$_w$—R', (C$_3$H$_6$O)$_w$—R', R' and w is an integer greater than one and less than 200.

In certain embodiments, porphyrin compound contains a functionalized porphyrin compound having at least a functional group attached to a porphyrin molecule, wherein the functional group is selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

The porphyrin compound may contain a functionalized porphyrin compound having at least a functional group attached to a porphyrin molecule, wherein the functional group contains an azide or bi-radical compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

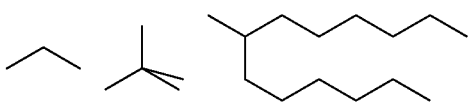

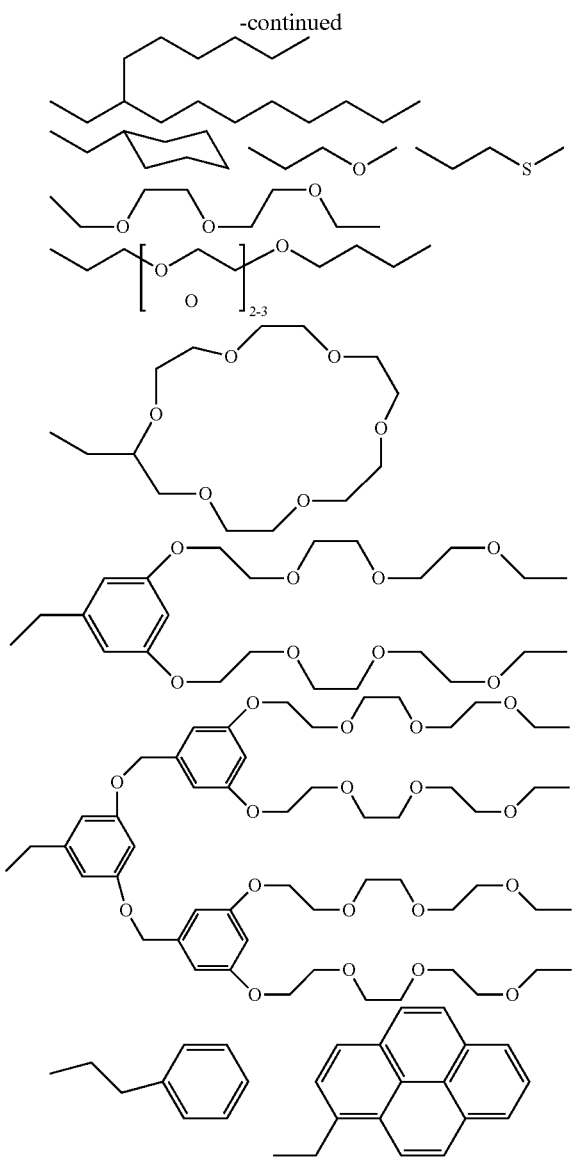

and combinations thereof.

The porphyrin compound is typically a planar molecule and the contact interface between a porphyrin compound and a graphene sheet is huge. Such a face-to-face or primary surface-to-primary surface contact enables fast and massive electron charge transfer between the two members (graphene and porphyrin compound) of a redox pair, leading to unexpectedly high pseudocapacitance.

In certain embodiments, the graphene sheets comprise single-layer or few-layer graphene, containing up to 10 graphene planes. By definition, a few-layer graphene sheet contains 2-10 planes of hexagonal carbon atoms ("graphene planes") stacked together via van der Waals forces. Graphene sheets may be selected from pristine graphene, graphene oxide, reduced graphene oxide, halogenated graphene, hydrogenated graphene, nitrogenated graphene, doped graphene, chemically functionalized graphene, or a combination thereof.

Although lithium metal (e.g. lithium foil, lithium particles, etc.) or lithium metal alloy (containing >80% by weight of Li element in the alloy) may be used as the anode active material, prelithiated particles of an anode active material commonly used in a lithium-ion battery (not lithium metal battery) is preferred. The lithium atoms reside in the interior of the prelithiated particles of the anode active material before the anode (along with a cathode, separator and electrolyte) is assembled into the electrochemical cell. Bare lithium metal is highly reactive with oxygen and moisture in the air, which may not be conducive to cell fabrication. More significantly, lithium metal in an electrochemical cell tends to develop metal surface powdering, dead lithium particles (being separated from Li foil), and dendrite (hence, internal shorting). Surprisingly, the instant approach of prelithiating anode active material particles can effectively eliminate these issues.

These prelithiated anode active materials may be preferably selected from the group consisting of (a) lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof (b) lithiated alloys or intermetallic compounds of Si, Ge, Sn, Pb, Sb, Bi, Zn, Al, Ti, Co, Ni, Mn, Cd, and their mixtures; (c) lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) lithiated graphite and carbon materials and (e) combinations thereof. These materials have been pre-loaded with lithium, pre-reacted with lithium, and/or pre-intercalated with lithium wherein substantially all lithium atoms have reside in the interior or internal structure of these materials.

In some preferred embodiments, the battery-like anode comprises a prelithiated anode active material selected from lithiated Si, lithiated Ge, lithiated Sn, lithiated SiO, lithiated $SnO_2$, lithiated $Co_3O_4$, lithiated $Mn_3O_4$, lithiated $Fe_3O_4$, lithiated $ZnMn_2O_4$, or a combination thereof and the anode does not contain lithium metal.

The prelithiated graphite or carbon materials may be selected from particles of natural graphite, artificial graphite, soft carbon, hard carbon, coke (e.g. needle coke), carbon fibers, graphite fibers, carbon nanofibers, carbon nanotubes, carbon nanohorns, expanded graphite platelets, graphene sheets, etc. that have been pre-loaded with lithium, pre-reacted with lithium, and/or pre-intercalated with lithium.

Soft carbon and hard carbon are two special groups of carbon materials well-known in the art. They are not a matter of being "soft" or "hard." Instead, soft carbon refers to a carbon material having graphitic domains properly aligned to enable graphitization at a temperature higher than 2,500° C. Hard carbon refers to a carbon material having graphitic domains that are not conducive to graphitization at a temperature higher than 2,500° C.

In certain embodiments, the anode active material of the internal hybrid electrochemical cell contains prelithiated particles of Si, Ge, SiO, Sn, $SnO_2$, or a combination thereof. In some preferred embodiments, the anode active material contains prelithiated particles of Si, Ge, SiO, Sn, $SnO_2$, or a combination thereof and the cathode active material contains a In some embodiments, the cathode further contains a conductive additive and the cathode forms a meso-porous structure having a pore size in the range from 2 nm to 50 nm.

The cathode may further contain a resin binder that bonds graphene sheets together. In some embodiments, the cathode further contains a conductive filler selected from graphite or carbon particles, carbon black, expanded graphite, graphene, carbon nanotube, carbon nanofiber, carbon fiber, conductive polymer, or a combination thereof.

In certain embodiments, the internal hybrid electrochemical cell contains an anode current collector to support the anode material and/or a cathode current collector to support the cathode material. Preferably, at least one of the anode and the cathode contains a current collector that is a porous, electrically conductive material selected from metal foam, metal web or screen, perforated metal sheet, metal fiber mat, metal nanowire mat, porous conductive polymer film, conductive polymer nanofiber mat or paper, conductive polymer foam, carbon foam, carbon aerogel, carbon xerogel, graphene foam, graphene oxide foam, reduced graphene oxide foam, carbon fiber paper, graphene paper, graphene oxide paper, reduced graphene oxide paper, carbon nanofiber paper, carbon nanotube paper, or a combination thereof.

In certain preferred embodiments, the anode active material contains prelithiated particles of Si, Ge, SiO, Sn, $SnO_2$, or a combination thereof and the prelithiated particles reside in pores of a porous, electrically conductive material selected from metal foam, metal web or screen, perforated metal sheet, metal fiber mat, metal nanowire mat, porous conductive polymer film, conductive polymer nanofiber mat or paper, conductive polymer foam, carbon foam, carbon aerogel, carbon xerogel, graphene foam, graphene oxide foam, reduced graphene oxide foam, carbon fiber paper, graphene paper, graphene oxide paper, reduced graphene oxide paper, carbon nanofiber paper, carbon nanotube paper, or a combination thereof.

The electrolyte in the internal hybrid electrochemical cell may be an organic liquid electrolyte, ionic liquid electrolyte, or gel electrolyte containing an amount of lithium ions when the cell is made.

The invention also provides an energy storage device comprising at least two presently invented internal hybrid electrochemical cells that are connected in series or in parallel.

The invention also provides an energy device comprising at least one internal hybrid electrochemical cell herein invented, which is electrically connected to an electrochemical cell (e.g. a battery, a supercapacitor, a fuel cell, etc.) in series or in parallel.

DESCRIPTION OF THE PREFERRED EMBODIMENTS

The present invention may be more readily understood by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting the claimed invention.

This invention provides an internal hybrid electrochemical energy storage device that exhibits a power density significantly higher than the power densities of conventional supercapacitors and dramatically higher than those of conventional lithium ion batteries. This device exhibits an energy density comparable to or higher than those of batteries, and significantly higher than those of conventional supercapacitors.

In certain preferred embodiments, the invented internal hybrid electrochemical cell comprises: (A) a pseudocapacitance-like cathode comprising a cathode active material that contains both graphene sheets and a porphyrin compound (porphyrin or a porphyrin complex) wherein the porphyrin compound is bonded to or supported by primary surfaces (not the edge faces) of the graphene sheets to form a redox pair for pseudocapacitance (the porphyrin compound and the graphene sheets, when intimately contacted together, form a redox pair providing large amounts of pseudocapacitance);

(B) a battery-like anode comprising a prelithiated anode active material (e.g. prelithiated Si, SiO, Sn, $SnO_2$, etc.) and containing no lithium metal, and (C) a lithium-containing electrolyte in physical contact with the anode and the cathode; wherein the cathode active material has a specific surface area no less than 100 $m^2/g$ which is in direct physical contact with the electrolyte. The cell is typically and preferably sealed in a protective casing (e.g. inside a pouch or steel cylindrical tube) to prevent exposure to air.

Figure 1:
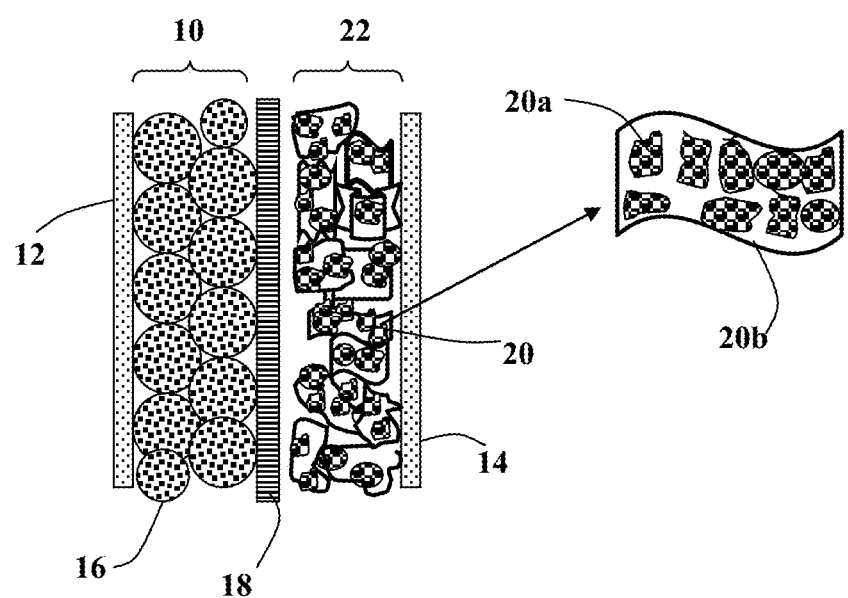
FIG. 1 Schematic of an internal hybrid electrochemical energy storage cell composed of a battery-like anode and a pseudocapacitor cathode, according to an embodiment of the present invention.

As illustrated in FIG. 1 as an example, the internal hybrid electrochemical cell has an anode active material layer 10 bonded to an anode current collector 12 using a binder resin (not shown). The anode active material layer 10 is composed of multiple prelithiated particles 16 of an anode active material (e.g. prelithiated Si particles each composed of Si that was pre-doped or pre-intercalated with Li atoms prior to cell assembly), optional conductive additive (not shown), and a resin binder (e.g. PVDF, SBR; not shown). There can be two anode active material layers bonded to the two primary surfaces of an anode current collector (e.g. a Cu foil).

The cell also has a cathode active material layer 22 bonded to a cathode current collector 14 using another binder resin (not shown). The cathode active material layer 22 is composed of multiple two-component nanosheets (e.g. 20) each containing substantially planar molecules of a porphyrin compound 20a bonded to a primary surface of a graphene sheet 20b. There can be two cathode active material layers bonded to two primary surfaces of a cathode current collector (e.g. Al foil). A porous separator 18 is disposed between the anode active material layer 10 and the cathode active material layer 22. Both the anode active material layer 10 and cathode active material layer 22 are impregnated with an electrolyte. The cell is then sealed in a protective housing.

As illustrated in FIG. 3(A)-3(K), porphyrin compounds are a group of heterocyclic macrocycle organic compounds, composed of four modified pyrrole subunits interconnected at their a carbon atoms via methine bridges (=CH—). The parent porphyrin is porphin, and substituted porphines are called porphyrins. The porphyrin ring structure is aromatic, with a total of 26 electrons in the conjugated system.

Figure 3A:
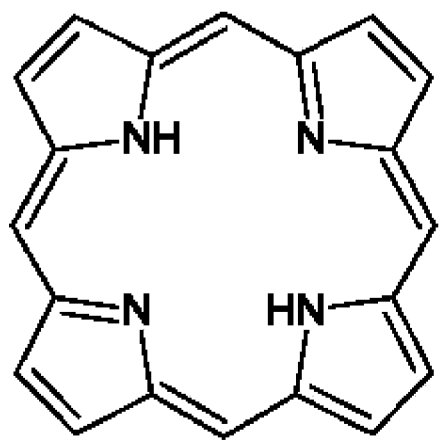
FIG. 3(A) Basic chemical formula of porphyrin.
Figure 3B:
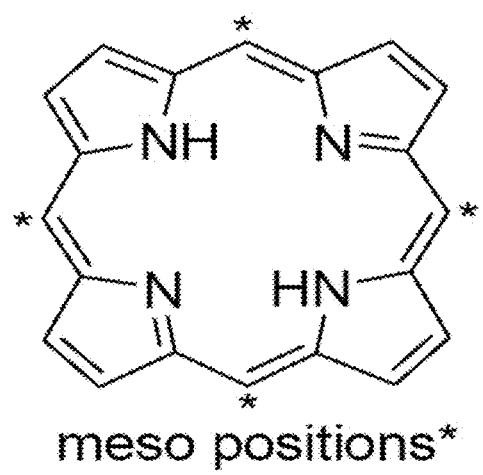
FIG. 3(B) shows the empty meso positions of a porphyrin molecule.
Figure 3C:
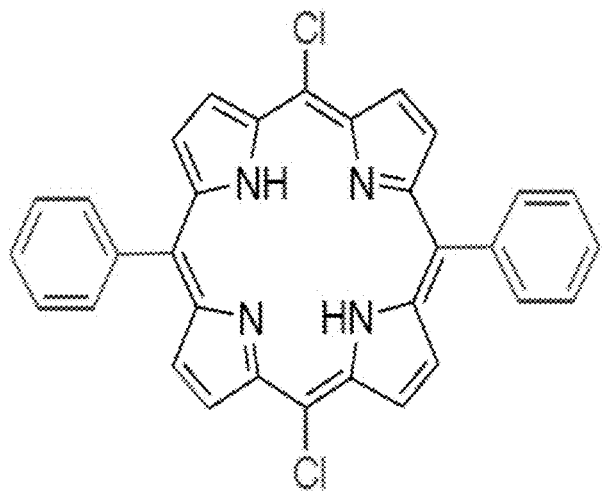
FIG. 3(C) shows the meso positions being attached with certain chemical or functional groups.
Figure 3D:
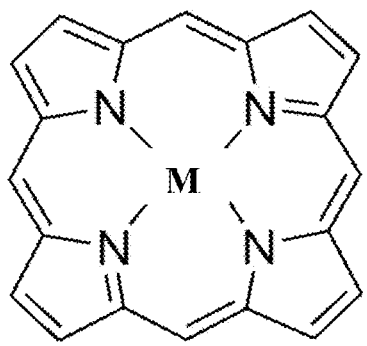
FIG. 3(D) The center of the porphyrin can hold a metal ion (e.g. denoted as M).
Figure 3E:
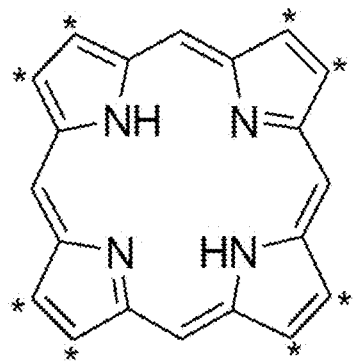
FIG. 3(E) shows the empty β (beta) positions of a porphyrin molecule.
Figure 3F:
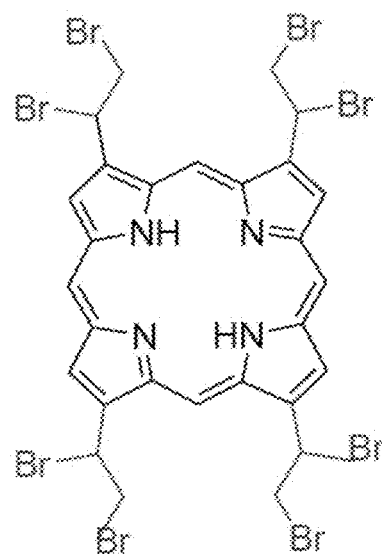
FIG. 3(F) shows some β positions being attached with some chemical groups.

The center of the porphyrin molecule can be empty (FIG. 3(A)) or hold a metal ion (e.g. denoted as M in FIG. 3(D)). This is commonly referred to as coordination. The porphyrin center can be "coordinated" with a wide array of transition metal elements. For instance, M can be V, Cr, Mn, Fe, Co, Ni, Cu, Zn, Sn, In, etc. Different functional groups can be attached to one or more sides of the porphyrin molecule. As an example, FIG. 3(B) shows the empty meso positions and FIG. 3(C) shows the meso positions being attached with certain chemical or functional groups. FIG. 3(E) shows the empty β (beta) positions and FIG. 3(F) shows some β positions being attached with some chemical groups. The center of the porphyrin can hold a metal and, in addition, some side positions are also attached with chemical groups. Examples are given in FIG. 3(G), FIG. 3(H), and FIG. 3(I). There can be many different combinations of many possible functional groups mixed and matched at these side and center locations to form different porphyrin complex compounds. Thus, the group of porphyrin and porphyrin complex compounds provides us with a broad array of potential electrode materials.

Preparation of porphyrin compounds can be accomplished in two broad categories of methods: biosynthesis and chemical synthesis. These are relatively well-known. For instance, biosynthesis can be used to produce HEME B (FIG. 3(I)).

One of the most common chemical synthesis methods for porphyrins is based on the work by Paul Rothemund [P. Rothemund, "Formation of Porphyrins from Pyrrole and Aldehydes," J. Am. Chem. Soc. (1935) 57 (10): 2010-2011; P. Rothemund, "A New Porphyrin Synthesis," J. Am. Chem. Soc. (1936) 58 (4): 625-627]. These basic techniques have been commonly practiced in modern chemistry field [e.g. A. D. Adler, et al. "A simplified synthesis for meso-tetraphenylporphine," J. Org. Chem. (1967) 32 (2): 476-476; Falvo, RaeAnne E.; Mink, Larry M.; Marsh, Diane F. "Microscale Synthesis and $^1H$ NMR Analysis of Tetraphenylporphyrins," J. Chem. Educ. 1999 (76): 237-239].

Figure 3G:
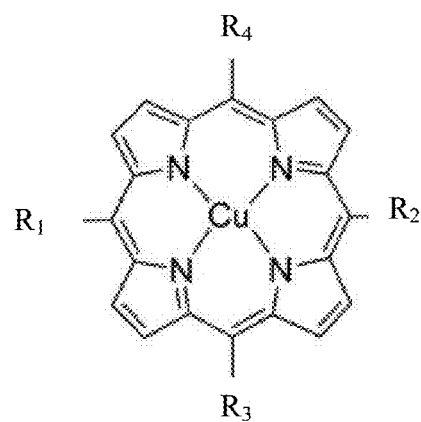
FIG. 3(G) The center of the porphyrin holds a metal (Cu) and, in addition, some side positions are also attached with chemical groups.
Figure 3H:
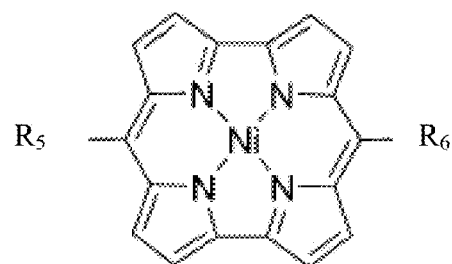
FIG. 3(H) The center of the porphyrin holds a metal (Ni) and some side positions are also attached with chemical groups.
Figure 3I:
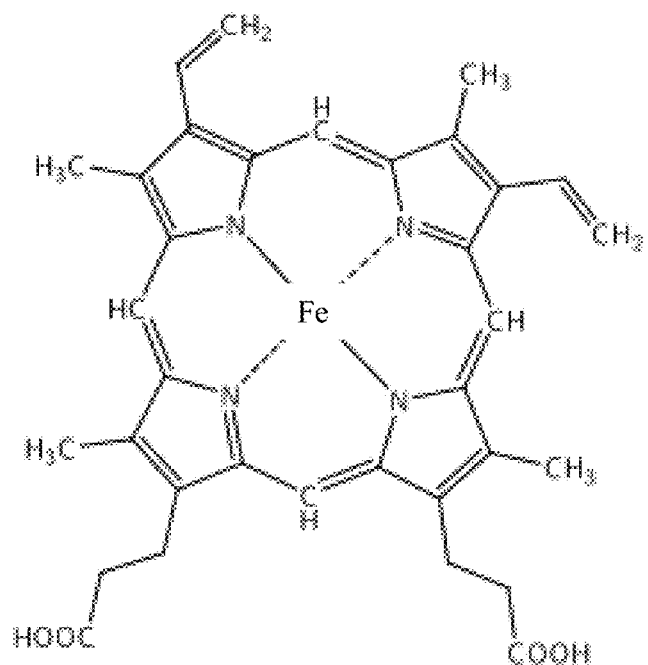
FIG. 3(I) The center of the porphyrin holds a metal (Fe) and some side positions are also attached with chemical groups.
Figure 3J:
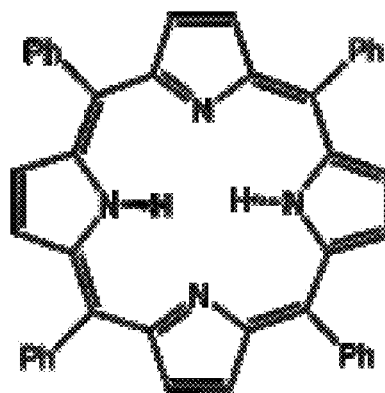
FIG. 3(J) Another example of a chemically functionalized Lewis structure for meso-tetraphenyl porphyrin—a Lewis structure for meso-tetraphenyl porphyrin.
Figure 3K:
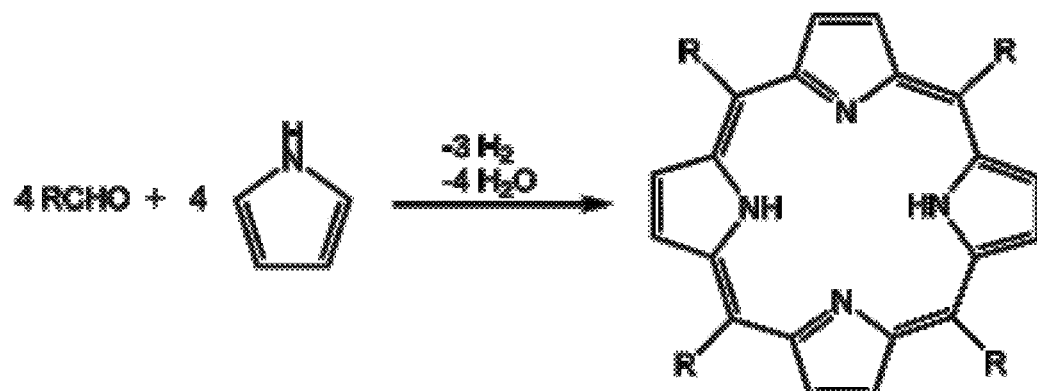
FIG. 3(K) An example of a chemical synthesis route for porphyrin.

The Rothemund approach is based on a condensation and oxidation, starting with pyrrole and an aldehyde (FIG. 3(K)). In solution-phase synthesis, acidic conditions are essential; formic acid, acetic acid, and propionic acid are typical reaction solvents. Alternatively, p-toluenesulfonic acid or various Lewis acids can be used with a non-acidic solvent. A large amount of side-product is formed and is removed, usually by recrystallization or chromatography. More environmentally green variants of the approach have been developed in which the reaction is performed with microwave irradiation using reactants adsorbed on acidic silica gel or at high temperature in the gas phase. In these cases, no additional acid is required [e.g. Petit, A.; Loupy, A.; Maiuard, P.; Momenteau, M., "Microwave Irradiation in Dry Media: A New and Easy Method for Synthesis of Tetrapyrrolic Compounds," Synth. Commun. 1992, 22 (8): 1137-1142]).

The functional chemical group (e.g. $R_1$, $R_2$, $R_3$, $R_4$, $R_5$, or $R_6$ in FIG. 3(G) and FIG. 3(H)) in a porphyrin compound may be selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from, a phenol group, R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si (—O—SiR'$_2$—)OR', R'—R'', R'—N—CO, $(C_2H_4O—)_w$H, $(—C_3H_6O—)_w$H, $(—C_2H_4O)_w$—R', $(C_3H_6O)_w$—R', R' and w is an integer greater than one and less than 200.

In certain embodiments, porphyrin compound contains a functionalized porphyrin compound having at least a functional group attached to a porphyrin molecule, wherein the functional group is selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

The porphyrin compound may contain a functionalized porphyrin compound having at least a functional group attached to a porphyrin molecule, wherein the functional group contains an azide or bi-radical compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

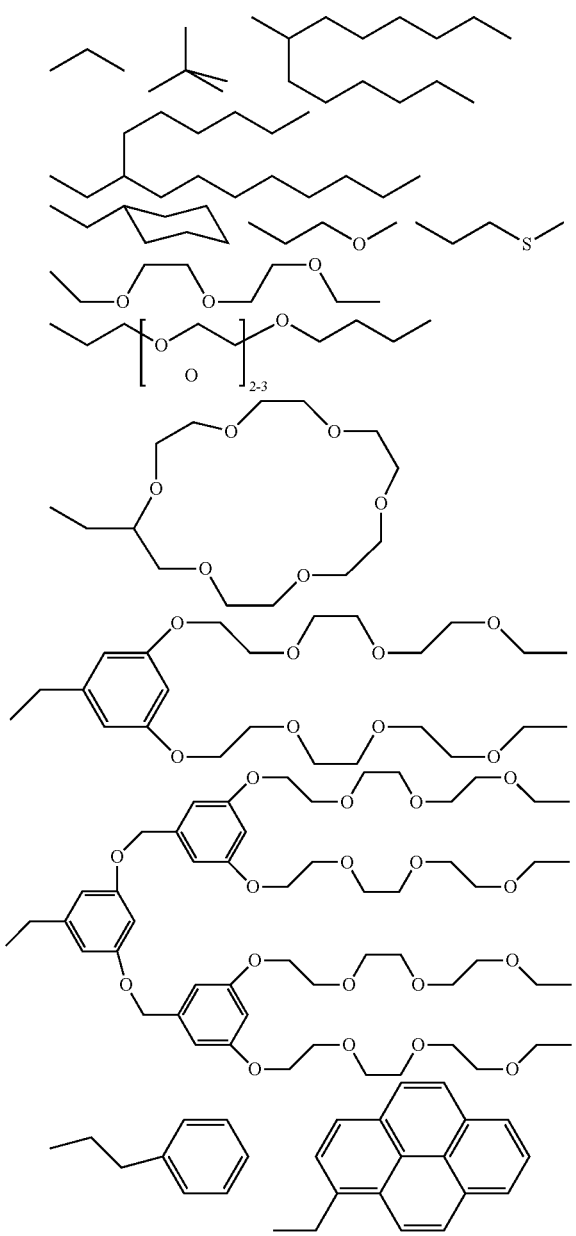

and combinations thereof.

A graphene sheet or nanographene platelet (NGP) is composed of one basal plane (graphene plane) or multiple basal planes stacked together in the thickness direction. In a graphene plane, carbon atoms occupy a 2-D hexagonal lattice in which carbon atoms are bonded together through strong in-plane covalent bonds. In the c-axis or thickness direction, these graphene planes may be weakly bonded together through van der Waals forces. An NGP can have a platelet thickness from less than 0.34 nm (single layer) to 100 nm (multi-layer). For the present electrode use, the preferred thickness is <10 nm, more preferably <3 nm (or <10 layers), and most preferably single layer graphene. The presently invented graphene-bonded porphyrin material preferably contains mostly single-layer graphene, but could make use of some few-layer graphene (less than 10 layers). The graphene sheet may contain a small amount (typically <25% by weight) of non-carbon elements, such as hydrogen, nitrogen, fluorine, and oxygen, which are attached to an edge or surface of the graphene plane.

Figure 2:
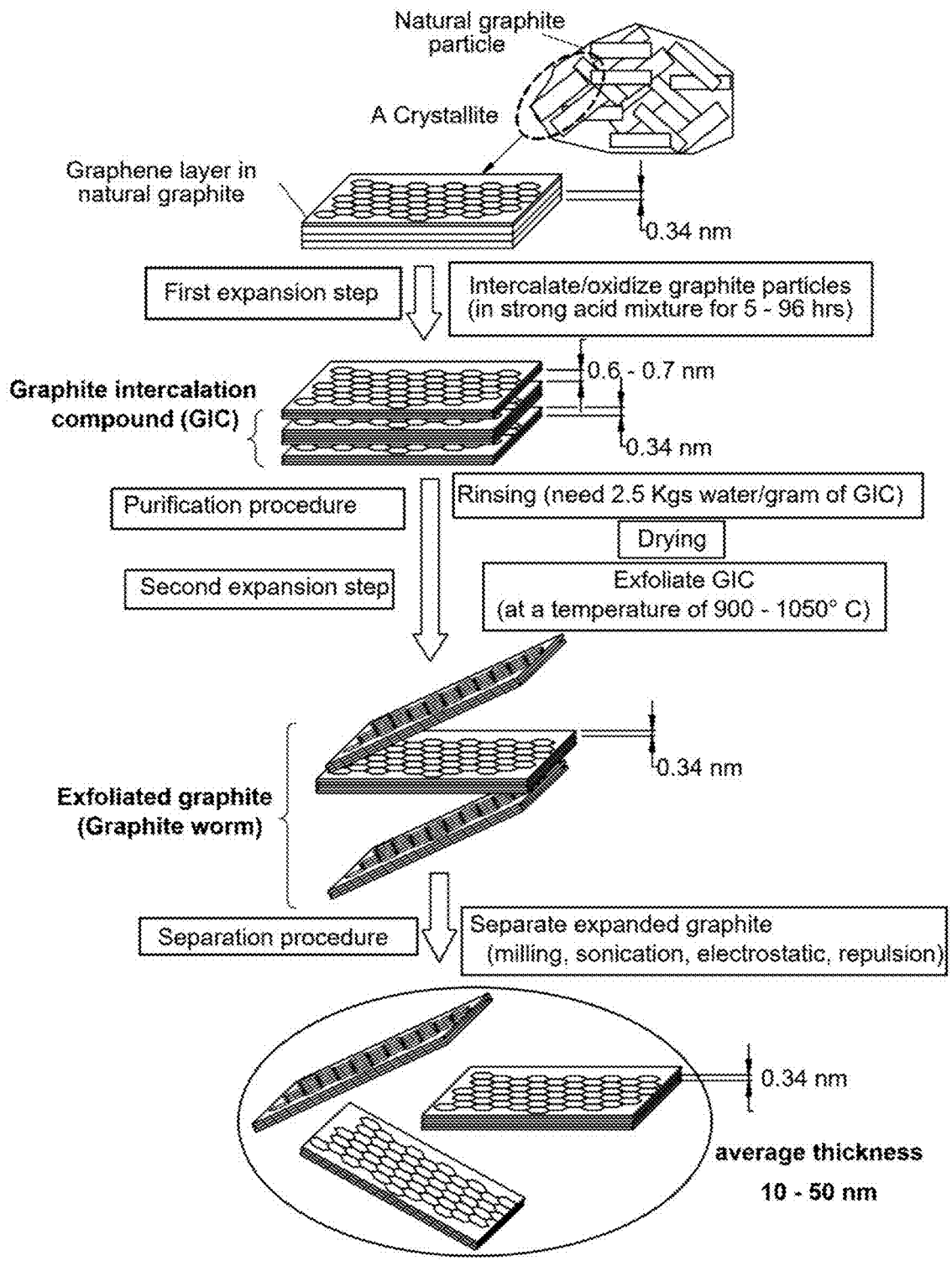
FIG. 2 Schematic of a process for producing graphene sheets.

Graphene sheets (herein also referred to as nanographene platelets, NGPs) may be produced by using several processes, discussed below:

Referring to FIG. 2, graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 30 minutes to 5 days). In order to reduce the time required to produce a precursor solution or suspension, one may choose to oxidize the graphite to some extent for a shorter period of time (e.g., 30 minutes) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. The unbroken graphite worms or individual graphite flakes are then re-dispersed in water, acid, or organic solvent and ultrasonicated to obtain a graphene polymer solution or suspension.

The pristine graphene material is preferably produced by one of the following three processes: (A) intercalating the graphitic material with a non-oxidizing agent, followed by a thermal or chemical exfoliation treatment in a non-oxidizing environment; (B) subjecting the graphitic material to a supercritical fluid environment for inter-graphene layer penetration and exfoliation; or (C) dispersing the graphitic material in a powder form to an aqueous solution containing a surfactant or dispersing agent to obtain a suspension and subjecting the suspension to direct ultrasonication.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature $T>31°$ C. and pressure $P>7.4$ MPa) and water (e.g., at $T>374°$ C. and $P>22.1$ MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nano-scaled platelets, which are pristine, non-oxidized NGPs.

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

The laminar graphite materials used in the prior art processes for the production of the GIC, graphite oxide, and subsequently made exfoliated graphite, flexible graphite sheets, and graphene platelets were, in most cases, natural graphite. However, the starting material may be selected from the group consisting of natural graphite, artificial graphite (e.g., highly oriented pyrolytic graphite, HOPG), graphite oxide, graphite fluoride, graphite fiber, carbon fiber, carbon nanofiber, carbon nanotube, mesophase carbon micro-bead (MCMB) or carbonaceous microsphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

The presently invented process typically resulted in nanographene sheets that, when formed into a thin film with a thickness no greater than 100 nm, exhibits an electrical conductivity of at least 10 S/cm, often higher than 100 S/cm, and, in many cases, higher than 1,000 S/cm. The resulting NGP powder material typically has a specific surface area from approximately 300 $m^2/g$ to 2,600 $m^2/g$ and, in many cases, comprises single-layer graphene or few-layer graphene sheets.

When these graphene sheets are combined with a porphyrin compound to form graphene-porphyrin compound hybrid sheets, these hybrid 2D structures (when packed into a dry electrode) exhibit an electrical conductivity typically no less than $10^{-2}$ S/cm (typically and preferably greater than 1 S/cm and most typically and preferably greater than 100 S/cm; some being greater than 2,000 S/cm). The graphene component is typically in an amount of from 0.5% to 99% by weight (preferably from 1% to 90% by weight and more preferably between 5% and 80%) based on the total weight of graphene and the porphyrin compound combined.

Graphene sheets may be oxidized to various extents during their preparation, resulting in graphite oxide or graphene oxide (GO). Hence, in the present context, graphene preferably or primarily refers to those graphene sheets containing no or low oxygen content; but, they can include GO of various oxygen contents. Further, graphene may be fluorinated to a controlled extent to obtain graphene fluoride.

The NGPs may be obtained from exfoliation and platelet separation of a natural graphite, synthetic graphite, highly oriented pyrolytic graphite, graphite fiber, carbon fiber, carbon nanofiber, graphitic nanofiber, spherical graphite or graphite globule, mesophase micro-bead, mesophase pitch, graphitic coke, or graphitized polymeric carbon.

For instance, as discussed earlier, the graphene oxide may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). The resulting graphite oxide particles may then be subjected to thermal exfoliation or ultrasonic wave-induced exfoliation to produce GO sheets.

Pristine graphene may be produced by direct ultrasonication (also known as liquid phase production) or supercritical fluid exfoliation of graphite particles. These processes are well-known in the art. Multiple pristine graphene sheets may be dispersed in water or other liquid medium with the assistance of a surfactant to form a suspension.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. *"Halogenated Graphenes: Rapidly Growing Family of Graphene Derivatives"* ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \le x \le 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

It has been commonly believed that a high specific surface area is an undesirable feature of cathodes (particularly transition metal oxide cathodes) for lithium-ion cells based on the belief that a high surface area leads to the formation of more solid-electrolyte interface (SEI), a common cause of capacity irreversibility or capacity loss. We have herein defied this expectation and discovered that these porphyrin compounds, coupled with graphene, can be superior cathode materials for the instant internal hybrid cells, which could operate tens of thousands of cycles without any significant capacity decay. Also surprisingly, these porphyrin compounds, when bonded to graphene sheet surfaces in a face-to-face manner and when the specific surface area of the resulting cathode exceeds 100 m$^2$/g (preferably >500 m$^2$/g), exhibit a specific capacity significantly higher than those of conventional pseudocapacitor electrode.

A conductive additive is generally not needed since graphene sheets are conducting even though the porphyrin compound are generally not electrically conducting. However, one may choose to add a conductive additive and/or a binder material (e.g. binder resin or carbonized resin) to form an electrode of structural integrity. The conductive additive or filler may be selected from any electrically conductive material, but is advantageously selected from graphite or carbon particles, carbon black, expanded graphite, graphene, carbon nanotube, carbon nanofiber, carbon fiber, conductive polymer, or a combination thereof. The amount of conductive fillers is preferably no greater than 30% by weight based on the total cathode electrode weight (without counting the cathode current collector weight), preferably no greater than 15% by weight, and most preferably no greater than 10% by weight. The amount of binder material is preferably no greater than 15% by weight, more preferably no greater than 10%, and most preferably no greater than 5% by weight. It is important to note that the porphyrin-bonded graphene sheets, with or without the conductive filler and binder, must form an electrode having a specific surface area greater than 100 m$^2$/g (preferably >500 m$^2$/g).

The internal hybrid cell contains a negative electrode (including an optional current collector and an anode active material layer) containing a high-capacity active material (e.g. Si, Ge, Sn, SiO, SnO$_2$, etc.) that is prelithiated before the anode active material layer is made. Preferred electrolyte types include organic liquid electrolyte, gel electrolyte, and ionic liquid electrolyte (preferably containing lithium salts dissolved therein), or a combination thereof, although one may choose to use aqueous or solid electrolytes.

In one preferred embodiment, the anode active material is selected from a lithium intercalation compound, a lithiated compound, lithiated titanium dioxide, lithium titanate, lithium manganate, a lithium transition metal oxide, Li$_4$Ti$_5$O$_{12}$, or a combination thereof. The lithium intercalation compound or lithiated compound may be selected from the following groups of materials: (a) lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) lithiated alloys or intermetallic compounds of Si, Ge, Sn, Pb, Sb, Bi, Zn, Al, Ti, Co, Ni, Mn, Cd, and their mixtures; (c) lithiated oxides, carbides, nitrides, sulfides, phosphides, selenides, tellurides, or antimonides of Si, Ge, Sn, Pb, Sb, Bi, Zn, Al, Fe, Co, Ni, Mn, Cd, and mixtures or composites thereof, (d) lithiated salts or hydroxides of Sn; or (e) lithiated graphite and carbon materials. Preferably, there is no lithium metal (e.g. Li foil, Li chips, Li particles, etc.) present in the internal hybrid electrochemical cell.

Prior to prelithiation, particles of the non-carbon based anode active material may be coated with a carbonizable coating material (e.g., phenolic resin, poly(furfuryl alcohol), coal tar pitch, or petroleum pitch). The coating can then be carbonized to produce an amorphous carbon or polymeric carbon coating on the surface of these Si particles. Such a conductive surface coating can help maintain a network of electron-conducting paths during repeated charge/discharge cycles and prevent undesirable chemical reactions between Si and electrolyte from happening. Hence, the presently invented method may further comprise a step of coating a surface of the fine particles with a thin layer of carbon having a thickness less than 1 μm prior to being subjected to lithiating. The thin layer of carbon preferably has a thickness less than 100 nm. Such a thin layer of carbon may be obtained from pyrolization of a polymer, pitch, or organic precursor or obtained by chemical vapor deposition, physical vapor deposition, sputtering, etc.

Alternatively, the particles of an anode active material may be coated with a layer of graphene, electron-conducting polymer, or ion-conducting polymer. Such coating processes are well-known in the art.

Prelithiation can be accomplished in several different ways that can be classified into 3 categories: physical methods, electrochemical methods, and chemical methods. These methods are well-known in the art. Among these, the electrochemical intercalation is the most effective. Lithium ions can be intercalated into non-Li elements (e.g. Si, Ge, and Sn) and compounds (e.g. SnO$_2$ and Co$_3$O$_4$) up to a weight percentage of 54.68% (see Table 1 below). For Zn, Mg, Ag, and Au, the amount of Li can reach 99% by weight.

TABLE 1

Lithium storage capacity of selected non-Li elements.

| Intercalated compound | Atomic weight of Li, g/mole | Atomic weight of active material, g/mole | Max. wt. % of Li |
|---|---|---|---|
| Li$_4$Si | 6.941 | 28.086 | 49.71 |
| Li$_{4.4}$Si | 6.941 | 28.086 | 54.68 |
| Li$_{4.4}$Ge | 6.941 | 72.61 | 30.43 |
| Li4.4Sn | 6.941 | 118.71 | 20.85 |
| Li$_3$Cd | 6.941 | 112.411 | 14.86 |
| Li$_3$Sb | 6.941 | 121.76 | 13.93 |
| Li$_{4.4}$Pb | 6.941 | 207.2 | 13.00 |
| LiZn | 6.941 | 65.39 | 7.45 |
| Li$_3$Bi | 6.941 | 208.98 | 8.80 |

In the prelithiated particles, the lithium atoms reside in the interior of the anode active material particles before the anode, a cathode, a separator and electrolyte are assembled to become an electrochemical cell. Bare lithium metal is highly reactive with oxygen and moisture in the air, which is not conducive to cell fabrication. Prelithiation of anode active material particles eliminates this shortcoming. More significantly, lithium metal in an electrochemical cell tends to develop metal surface powdering, dead lithium particles (being separated from Li foil), and dendrite (hence, internal shorting). Surprisingly, the instant strategy of using prelithiated anode active material particles effectively eliminates these issues.

The particles of the anode active material may be in the form of a nanoparticle, nanowire, nanofiber, nanotube, nanosheet, nanoplatelet, nanodisc, nanobelt, nanoribbon, or nanohorn. They can be non-lithiated (when incorporated into the anode active material layer) or pre-lithiated to a desired extent (up to the maximum capacity as allowed for a specific element or compound.

In a prior art lithium-ion capacitor (LIC), the primary cathode active material is a carbon material (e.g., activated carbon or CNT bundles), and lithium titanate or lithiated graphite particles constitute the anode. In other cases, a sacrificial lithium metal foil is implemented into the LIC cell. This lithium metal layer is then partially or entirely ionized and dissolved during the first discharge cycle of the cell. The carbon material in a conventional LIC cathode provides electric double layers of charges. In contrast, the cathode of instant internal hybrid cell is based on graphene-porphyrin compound redox pairs that produce pseudocapacitance. Additionally, the anode active material is a pre-lithiated high-capacity material, such as prelithiated Si, Ge, Sn, SiO, and $SnO_2$. Preferably, there is no lithium layer (Li metal foil or Li metal particles, for instance) that is added into the presently invented internal hybrid cell; instead, just prelithiated particles of an anode active material Such a strategy obviates the need to handle lithium metal during cell manufacturing, which is challenging and expensive; cell production must be conducted in a battery-grade dry room.

A wide range of electrolytes can be used for practicing the instant invention. Most preferred are non-aqueous organic and/or ionic liquid electrolytes. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (gamma-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. The electrolytic salts to be incorporated into a non-aqueous electrolyte may be selected from a lithium salt, such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a supercapacitor.

The following examples serve to illustrate the preferred embodiments of the present invention and should not be construed as limiting the scope of the invention:

Example 1: Preparation of Isolated Graphene Oxide Sheets and Internal Hybrid Cells Chopped graphite fibers with an average diameter of 12 m and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 12 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. The resulting suspension contains GO sheets being suspended in water. The GO sheets were thermally reduced at 200° C. for 24 hours to obtain reduced graphene oxide (RGO) sheets.

A functionalized porphyrin, [5,15-bis-(ethynyl)-10,20-diphenylporphinato]copper(II) (CuDEPP), was synthesized according to Gao, et al. [Ping Gao, et al. "A Porphyrin Complex as a Self-Conditioned Electrode Material for High-Performance Energy Storage," Angewandte Chemie, Vol. 129, Issue 35, Aug. 21, 2017, Pages 10477-10482; Supporting Information]. However, the instant procedure has a major deviation from Gao's in that RGO sheets were added into the THF solution during the final phase of CuDEPP preparation. Specifically, [5,15-Bis(trimethylsilylethynl)-10, 20-dipheny)porphinato]copper(II) (0.322 g, 0.45 mmol) was dissolved in THF (50 mL) under an argon atmosphere at 0° C. Then tetrabutylammonium fluoride (0.252 g, 0.8 mmol) and a desired amount of RGO were added; the RGO amount depending on the final weight ratio between RGO and CuDEPP. After 40 min, the reaction mixture was poured into 50 mL MeOH. The precipitate was filtered and washed by 100 mL MeOH. The product was collected to yield a dark purple solid, CuDEPP supported on graphene sheet surfaces.

Three types of cells were made, all having lithiated Si particles as the anode active material and 1 M of $LiPF_6$ in EC-PC (50/50) as the electrolyte. One cell contains RGO sheets (no functionalized porphyrin) as the cathode active material. A second cell contains functionalized porphyrin as the cathode active material. A third cell contains the functionalized porphyrin/RGO hybrid nanosheets as the cathode active material. The conventional slurry coating and drying process was followed to make the cathode electrode. For instance, for the first cell, RGO sheets were mixed with NMP to form a slurry, which was then coated onto both primary surfaces of a sheet of Al foil (serving as a current collector). The cathode contains RGO sheets (88% by wt.), 5% acetylene black as a conductive additive, and 7% PVDF binder resin. The anode (containing fully lithiated Si nano particles) was also made in a similar manner. An anode and a cathode are spaced by a porous separator to form an electrochemical cell.

Example 2: Preparation of Single-Layer Graphene Sheets from Meso-Carbon Micro-Beads Meso-carbon microbeads (MCMBs) were supplied from China Steel Chemical Co., Kaohsiung, Taiwan. This material has a density of about 2.24 $g/cm^3$ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultrasonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets, in combinations with several different porphyrin compounds, were then made into pseudocapacitor cathodes. Each pseudocapacitor cathode was then paired with a lithiated anode active material layer and a separator/electrolyte to form a cell. Several types of cells, containing different anode and cathode material, were made and tested.

Example 3: Preparation of Pristine Graphene (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a graphene supercapacitor having a higher electrical conductivity and lower equivalent series resistance. Pristine graphene sheets were produced by using the direct ultrasonication process (also called the liquid-phase exfoliation process).

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are essentially no other non-carbon elements. The pristine graphene sheets were then bonded with several different porphyrin compounds to form different pseudocapacitance cathodes.

Example 4: Preparation of Graphene Oxide (GO) Suspension from Natural Graphite and of Subsequent GO-Supported Porphyrin Electrodes Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions using ultrasonication. Some of these GO sheets were then dispersed in a liquid medium, along with a desired type of porphyrin material. The resulting suspension containing porphyrin was then spray-dried to form isolated porphyrin-bonded graphene nanosheets.

Example 5: Preparation of Graphene Fluoride (GF)

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion, but longer sonication lengths of time ensured better stability. During the sonication procedure, porphyrin was added for the preparation of the pseudocapacitance cathodes.

Example 6: Preparation of Nitrogenataed Graphene/Porphyrin-Based Pseudocapacitor Cathodes Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1:0.5, 1:1 and 1:2, respectively and the nitrogen contents of these samples were 14.7, 18.2 and 17.5 wt %, respectively as determined by elemental analysis. These nitrogenataed graphene sheets remain dispersible in water.

The polyporphyrin (TThPP) linked by 4-thiophenephenyl groups was synthesized through an in situ chemical oxidative polymerization on the surface of graphene sheets. The procedure began with synthesis of 4-(Thiophen-2-yl)benzaldehyde, which was based on the following sequence. As an example, to a solution of 4-bromobenzaldehyde (370 mg, 2.0 mmol) in dry THF (15 mL) was added the catalyst Pd(PPh3)4 (115 mg, 0.1 mmol) at room temperature under nitrogen. After the mixture was stirred at room temperature for 0.5 h, thiophen-2-ylboronic acid (384 mg, 1.5 mmol) and 2 N aqueous $K_2CO_3$ (2 mL, 4 mmol) were added into the reaction solution which was continually stirred for 0.5 h at room temperature. Then, the reaction mixture was refluxed overnight. After the reaction, the solution was cooled down to room temperature, and the solvent was removed. The residue was purified by silica gel column chromatography eluting with $CH_2Cl_2$/hexane (1:2) to give 4-(thiophen-2-yl) benzaldehyde (310 mg, 82%) as a yellow solid.

The synthesis of meso-tetrakis(4-thiophenephenyl)porphyrin (TThP) bonded on graphene surfaces were then conducted as follows: Into a 1000 mL three-necked flask, 4-(thiophen-2-yl)-benzaldehyde (940 mg, 5 mmol), pyrrole (356 mg, 5 mmol) and 500 mL of $CHCl_3$ were added. After they were pumped with nitrogen for 15 min, 1.62 mmol of boron trifluoride diethyl etherate (BFEE, 0.207 mL) was added into the solution. Then the mixture was stirred at room temperature under nitrogen atmosphere. The reaction was monitored by thin-layer chromatography (TLC). When the 4-(thiophen-2-yl)benzaldehyde was consumed, 3.75 mmol of 2,3-dichloro-5,6-dicyanol, 4-benzoquinone (DDQ, 0.851 g) and a desired amount of nitrogenated graphene sheets were added, and the mixture was allowed to stir for another 1 h. This amount of graphene sheets was varied to achieve a range of porphyrin/graphene ratios. Subsequently, the reaction was quenched by addition of 0.5 mL of triethylamine for 10 min. After evaporation of the solvent, the crude product was purified by column chromatography on silica gel using petroleum ether/$CH_2Cl_2$ (4:1) as the eluent. Then the product was filtered and washed with methanol until the filtrate became colorless to give meso-tetrakis(4-thiophenephenyl)porphyrin (TThP) as a purple solid bonded on graphene surfaces. TThP is an example of porphyrin-based polymers.

Example 7: Preparation of Porphyrin Ni-Bonded Graphene Sheets

A porphyrin containing Ni at its center, dimesityl-substituted norcorrole nickel(II) complex (NiNC), was synthesized according to the procedure described in Hiroshi Shinokubo. Angew. Chem., (2013), 125: 1400. doi: 10.1002/ange.201207020. However, before the final reaction was allowed to proceed, a desired amount of graphene sheets was added into the reactor.

Pouch cells using NiNC-bonded graphene sheets as a cathode active material (90% $ZrS_2$-bonded graphene nanosheets and 10% PVDF as a resin binder) and lithiated SiO or $SnO_2$ anode were made and tested. In all cells, the separator used was one sheet of micro-porous membrane (Celgard 2500). The current collector for the cathode was a piece of carbon-coated aluminum foil and that for the anode was Cu foil. The electrolyte solution was 1 M $LiPF_6$ dissolved in a mixture of ethylene carbonate (EC) and dimethyl carbonate (DMC) with a 3:7 volume ratio. The separator was wetted by a minimum amount of electrolyte to reduce the background current. Cyclic voltammetry and galvanostatic measurements of the lithium cells were conducted using an Arbin 32-channel supercapacitor-battery tester at room temperature (in some cases, at a temperature as low as −40° C. and as high as 60° C.).

Example 8: Details about Evaluation of Various Internal Hybrid Electrochemical Cells In a conventional cell, an electrode (cathode or anode), is typically composed of 85% of an electrode active material (e.g. graphene, activated carbon, or inorganic nano discs, etc.), 5% Super-P (acetylene black-based conductive additive), and 10% PTFE, which were mixed and coated on Al foil. The thickness of electrode is around 100 μm. For each sample, both coin-size and pouch cells were assembled in a glove box. The capacity was measured with galvanostatic experiments using an Arbin SCTS electrochemical testing instrument. Cyclic voltammetry (CV) and electrochemical impedance spectroscopy (EIS) were conducted on an electrochemical workstation (CHI 660 System, USA).

Galvanostatic charge/discharge tests were conducted on the samples to evaluate the electrochemical performance. For the galvanostatic tests, the specific capacity (q) is calculated as $$q=I*t/m \quad (1)$$

where I is the constant current in mA, t is the time in hours, and m is the cathode active material mass in grams. With voltage V, the specific energy (E) is calculated as, $$E=\int Vdq \quad (2)$$

The specific power (P) can be calculated as $$P=(E/t)(W/kg) \quad (3)$$

where t is the total charge or discharge step time in hours. The specific capacitance (C) of the cell is represented by the slope at each point of the voltage vs. specific capacity plot, $$C=dq/dV \quad (4)$$

For each sample, several current density (representing charge/discharge rates) were imposed to determine the electrochemical responses, allowing for calculations of energy density and power density values required of the construction of a Ragone plot (power density vs. energy density).

Figure 4:
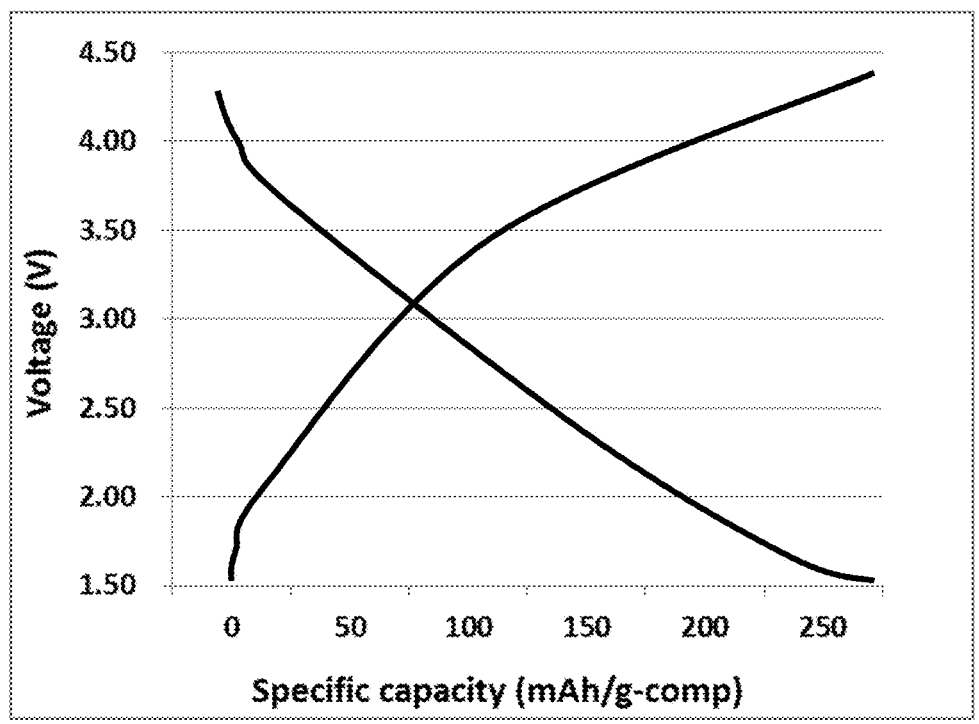
FIG. 4 Some representative charge-discharge curve of an internal hybrid cell, featuring a lithiated Si anode and a pseudocapacitance cathode containing porphyrin copper-bonded graphene sheets.

FIG. 4 shows some representative charge-discharge curve of an internal hybrid cell, featuring a lithiated Si anode and s pseudocapacitance cathode containing $MnO_2$ nano sheet/bonded graphene sheets (prepared in Example 1). The shapes of these curves are characteristic of pseudocapacitance behaviors, rather than electric double layer capacitance (EDLC) or lithium ion-intercalation type battery behavior. The corresponding cyclic voltammetry diagrams further confirm the same behaviors. It may be noted that, in contrast to the conventional lithium-ion capacitor, the instant internal hybrid cell does not have to be limited to an operating voltage from 2.0 V to 4.3 V.

Figure 5:
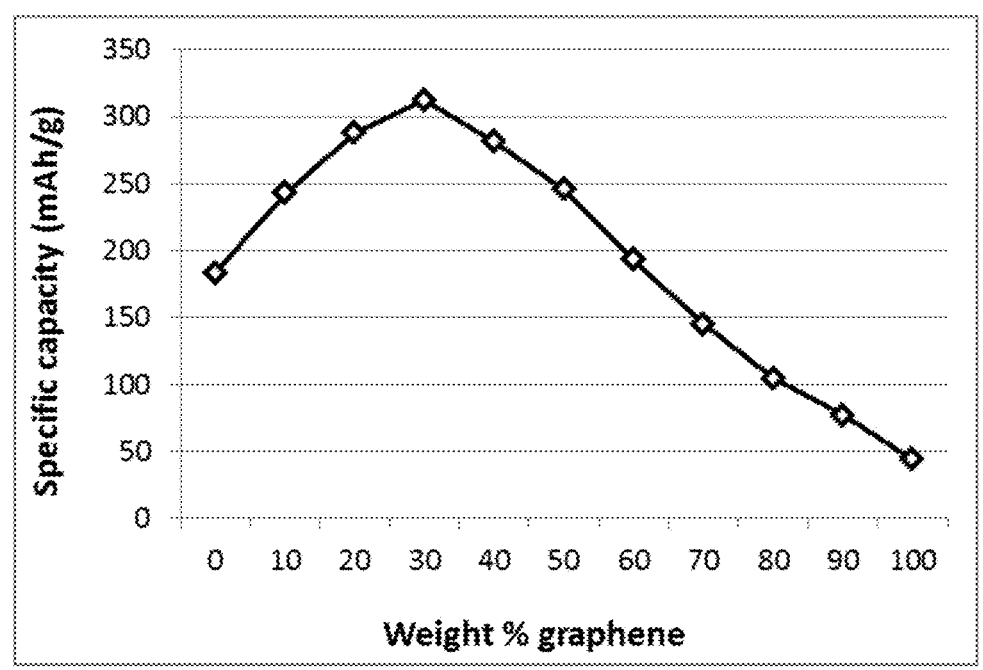
FIG. 5 The charge storage capacity values (based on the cathode active material weight) of a series of internal hybrid cells each featuring a lithiated Si anode and a pseudocapacitance cathode containing porphyrin copper-bonded graphene sheets, and those of the cells containing, in the cathode, porphyrin copper only or graphene sheets only as the cathode active material.

Shown in FIG. 5 are the charge storage capacity values (based on the total cathode active material weight) of a series of internal hybrid cells each featuring a lithiated Si anode and a pseudocapacitance cathode containing CuDEPP/bonded graphene sheets, and those of the cells containing, in the cathode, CuDEPP only or graphene sheets only as the cathode active material. These data have clearly exhibited surprising synergistic effects between a porphyrin molecule and a graphene sheet. When implemented alone as a cathode active material, either CuDEPP or graphene sheets provide very minimal charge storage capability. When combined to form a redox pair, the two species work together to provide exceptionally high charge storage capacity, up to 280 mAh/g (the sum of CuDEPP weight and graphene weight) between 1.5 V and 4.3 V.

Figure 6:
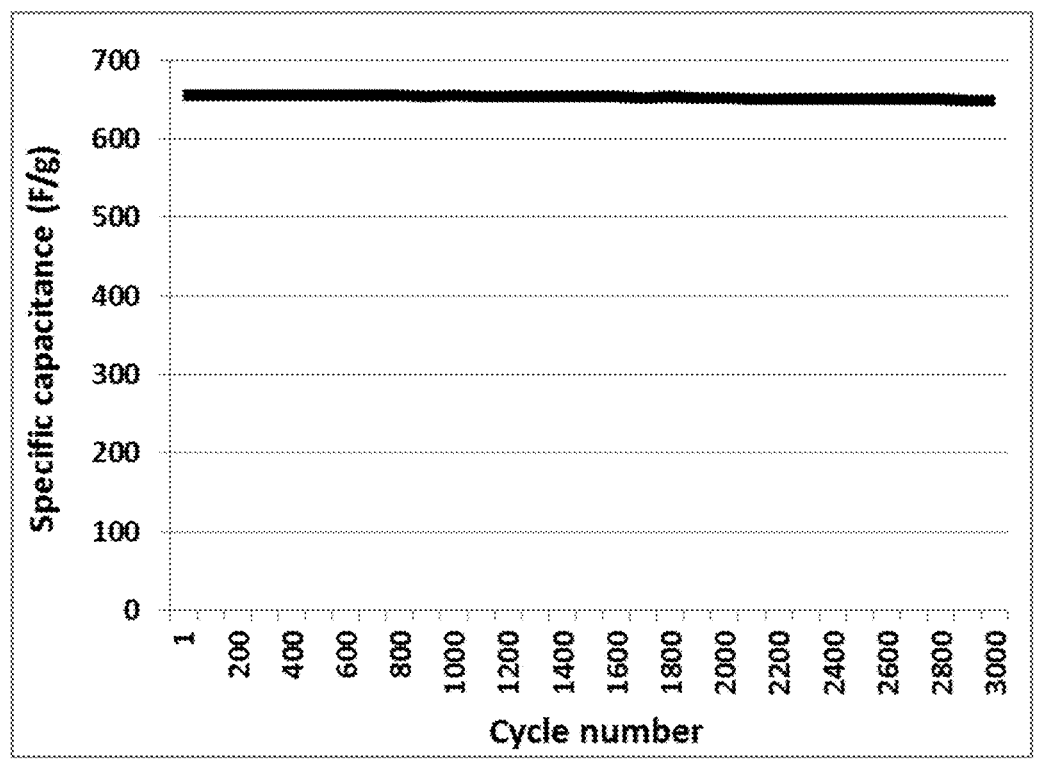
FIG. 6 The charge-discharge cycling curve of an internal hybrid cell, featuring a lithiated Si anode and a pseudocapacitance cathode containing porphyrin copper-bonded graphene sheets FIG. 7 Ragone plot of three types of electrochemical cells each having prelithiated SiO as the anode active material: a cell using graphene as a cathode active material, a cell using a porphyrin-Ni as the cathode active material, and porphyrin-Ni-bonded graphene sheets as a cathode active material.

The charge-discharge cycling data of a representative internal hybrid cell are summarized in FIG. 6, which indicates that the internal cell exhibits not only a high specific capacity but also a stable cycling behavior. The cell suffers a capacitance loss of less than 1.07% after 3,000 cycles, which is outstanding compared to conventional pseudocapacitors or lithium-ion batteries.

Figure 7:
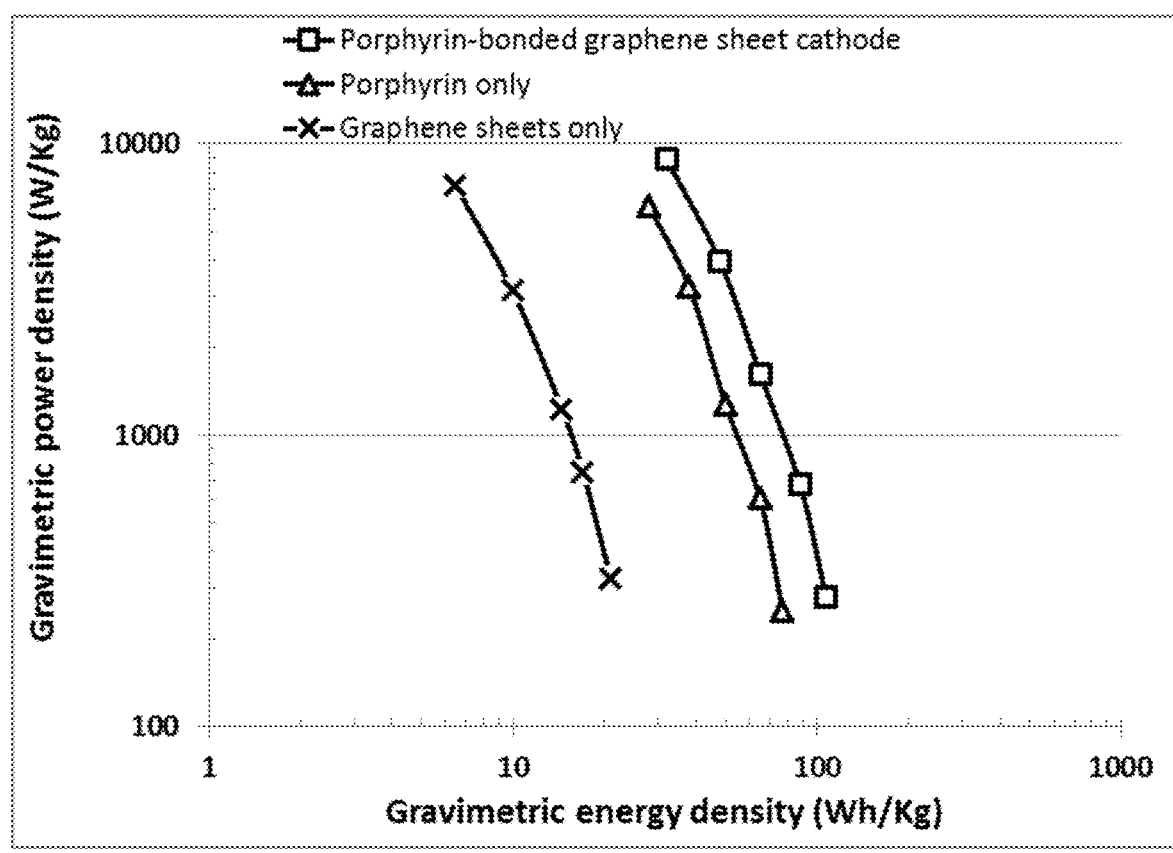

FIG. 7 shows the Ragone plots of three types of electrochemical cells each having a prelithiated SiO as the anode active material: (i) a cell using graphene as a cathode active material, (ii) a cell using porphyrin-Ni (+10% carbon black as a conductive additive) as the cathode active material, and (iii) an internal hybrid cell using porphyrin-Ni-bonded graphene sheets as a cathode active material (90% porphyrin-Ni-bonded graphene nanosheets and 10% PVDF as a resin binder 9). These results again have demonstrated an unexpected synergistic effect between porphyrin-Ni and graphene sheets when the pair of porphyrin/graphene materials is implemented as a pseudocapacitance cathode.

Figure 8:
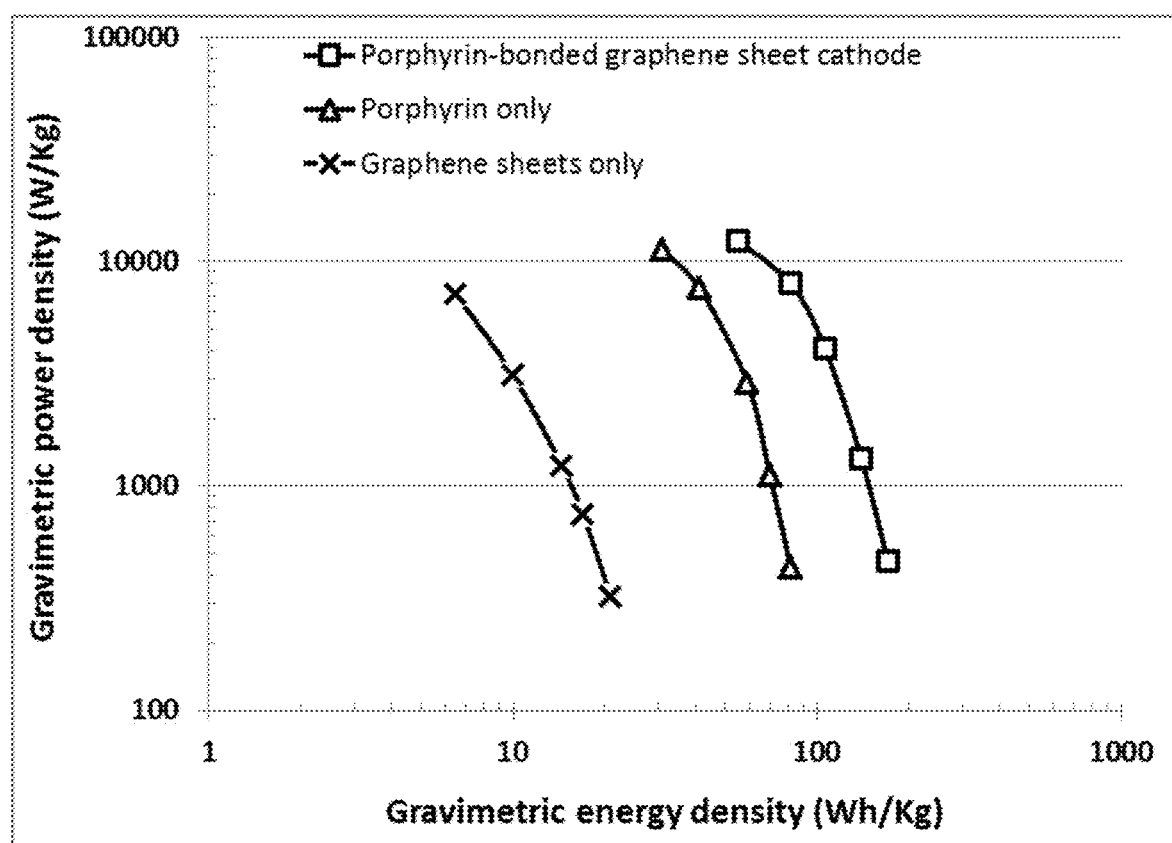
FIG. 8 Ragone plots of three types of electrochemical cells, each having prelithiated $SnO_2$ as the anode active material: (i) a cell using graphene as a cathode active material, (ii) a cell using a functionalized porphyrin-Fe as the cathode active material, and (iii) an internal hybrid cell using functionalized porphyrin-Fe-bonded graphene sheets as a cathode active material.

Shown in FIG. 8 are the Ragone plots of three types of electrochemical cells each having a prelithiated $SnO_2$ as the anode active material: (i) a cell using graphene as a cathode active material, (ii) a cell using a functionalized porphyrin-Fe as the cathode active material, and (iii) an internal hybrid cell using functionalized porphyrin-Fe bonded graphene sheets as a cathode active material. These results again have demonstrated an unexpected synergistic effect between a functionalized porphyrin and graphene sheets when this pair of porphyrin/graphene is implemented as a pseudocapacitance cathode. Quite significantly, the energy density of the presently invented internal hybrid cell is as high as 171 Wh/kg, which is comparable to those (150-220 Wh/kg) of lithium-ion batteries. A maximum power density of 12.4 kW/kg is dramatically higher than those (typically <0.5 kW/kg) of conventional lithium-ion batteries and even higher than those of supercapacitors. These results have demonstrated that the presently invented internal hybrid electrochemical cells have the best characteristics of both lithium-ion batteries and supercapacitors.

We claim:
1. An internal hybrid electrochemical cell comprising:
   (A) a cathode comprising a cathode active material that contains both graphene sheets and a porphyrin compound, including porphyrin or a porphyrin complex, wherein said porphyrin compound is bonded to or supported by primary surfaces of said graphene sheets to form a redox pair for pseudocapacitance, wherein said porphyrin compound is selected from porphyrin, porphyrin-copper, porphyrin-zinc, porphyrin-nickel, porphyrin-cobalt, porphyrin-manganese, porphyrin-tin, porphyrin-cadmium, porphyrin-vanadium, polyporphyrin, a functionalized porphyrin compound, or a combination thereof;
   (B) an anode comprising lithium metal, lithium metal alloy, or a prelithiated anode active material selected from the group consisting of (a) lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) lithiated alloys or intermetallic compounds of Si, Ge, Sn, Pb, Sb, Bi, Zn, Al, Ti, Co, Ni, Mn, Cd, and their mixtures; (c) lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) lithiated graphite and carbon materials; and (e) combinations thereof; and (C) a lithium-containing electrolyte in physical contact with the anode and the cathode; wherein said cathode active material has a specific surface area no less than 100 m²/g which is in direct physical contact with said electrolyte.

2. The internal hybrid electrochemical cell of claim 1, wherein said anode comprises a prelithiated anode active material selected from lithiated Si, lithiated Ge, lithiated Sn, lithiated SiO, lithiated SnO$_2$, lithiated Co$_3$O$_4$, lithiated Mn$_3$O$_4$, lithiated Fe$_3$O$_4$, lithiated ZnMn$_2$O$_4$, or a combination thereof and said anode does not contain lithium metal.

3. The internal hybrid electrochemical cell of claim 1, wherein said lithiated graphite and carbon materials are selected from particles of natural graphite, artificial graphite, soft carbon, hard carbon, coke, carbon fibers, graphite fibers, carbon nanofibers, carbon nanotubes, carbon nanohorns, expanded graphite platelets, graphene sheets, or a combination thereof that have been pre-loaded with lithium, pre-reacted with lithium, and/or pre-intercalated with lithium.

4. The internal hybrid electrochemical cell of claim 1, wherein said porphyrin compound is selected from a porphyrin-transition metal complex.

5. An internal hybrid electrochemical cell comprising:
(A) a cathode comprising a cathode active material that contains both graphene sheets and a porphyrin compound, including porphyrin or a porphyrin complex, wherein said porphyrin compound is bonded to or supported by primary surfaces of said graphene sheets to form a redox pair for pseudocapacitance, wherein said porphyrin compound contains a functionalized porphyrin compound having at least a functional group attached to a porphyrin molecule, wherein said functional group is selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—)OR', R'—R'', R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200;
(B) an anode comprising lithium metal, lithium metal alloy, or a prelithiated anode active material selected from the group consisting of (a) lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) lithiated alloys or intermetallic compounds of Si, Ge, Sn, Pb, Sb, Bi, Zn, Al, Ti, Co, Ni, Mn, Cd, and their mixtures; (c) lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) lithiated graphite and carbon materials; and (e) combinations thereof; and (C) a lithium-containing electrolyte in physical contact with the anode and the cathode;
wherein said cathode active material has a specific surface area no less than 100 m²/g which is in direct physical contact with said electrolyte.

6. An internal hybrid electrochemical cell comprising:
(A) a cathode comprising a cathode active material that contains both graphene sheets and a porphyrin compound, including porphyrin or a porphyrin complex, wherein said porphyrin compound is bonded to or supported by primary surfaces of said graphene sheets to form a redox pair for pseudocapacitance, wherein said porphyrin compound contains a functionalized porphyrin compound having at least a functional group attached to a porphyrin molecule, wherein said functional group is selected from the group consisting of amidoamines, polyamides, aliphatic amines, modified aliphatic amines, cycloaliphatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof;
(B) an anode comprising lithium metal, lithium metal alloy, or a prelithiated anode active material selected from the group consisting of (a) lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) lithiated alloys or intermetallic compounds of Si, Ge, Sn, Pb, Sb, Bi, Zn, Al, Ti, Co, Ni, Mn, Cd, and their mixtures; (c) lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) lithiated graphite and carbon materials; and (e) combinations thereof; and
(C) a lithium-containing electrolyte in physical contact with the anode and the cathode; wherein said cathode active material has a specific surface area no less than 100 m²/g which is in direct physical contact with said electrolyte.

7. The internal hybrid electrochemical cell of claim 1, wherein said porphyrin compound contains a functionalized porphyrin compound having at least a functional group attached to a porphyrin molecule, wherein said functional group contains an azide or bi-radical compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

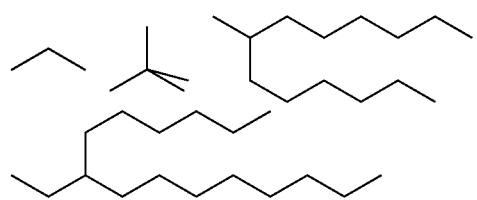

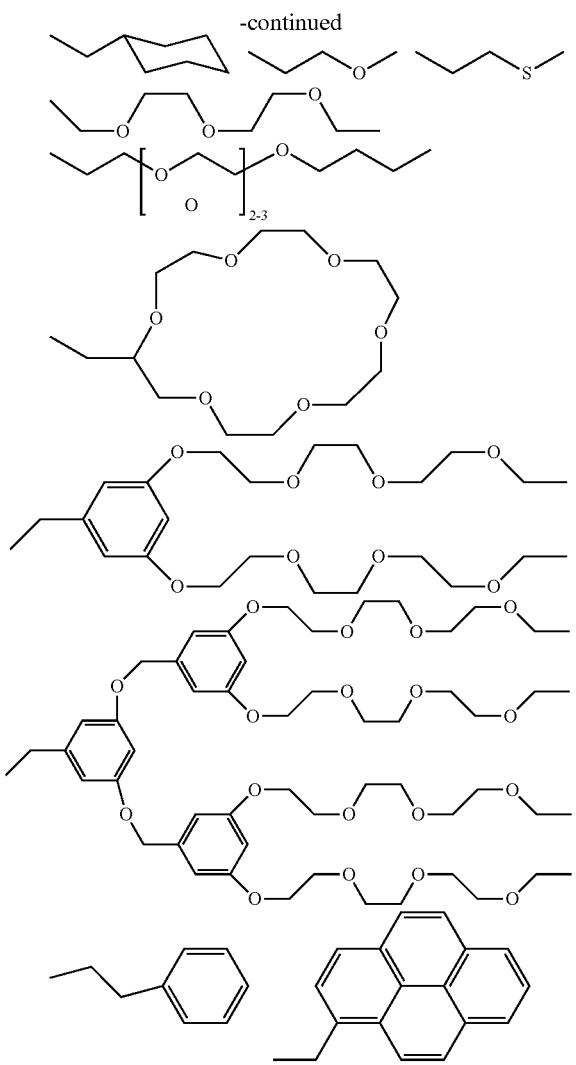

and combinations thereof.

8. The internal hybrid electrochemical cell of claim 1, wherein said graphene sheets comprise single-layer or few-layer graphene, containing up to 10 graphene planes, selected from pristine graphene, graphene oxide, reduced graphene oxide, halogenated graphene, hydrogenated graphene, nitrogenated graphene, doped graphene, chemically functionalized graphene, or a combination thereof.

9. The internal hybrid electrochemical cell of claim 1, wherein said cathode active material has a specific surface area from 200 m$^2$/g to 500 m$^2$/g which is in direct physical contact with said electrolyte and said graphene sheets contain single-layer graphene.

10. The internal hybrid electrochemical cell of claim 1, wherein said cathode active material has a specific surface area no less than 500 m$^2$/g which is in direct physical contact with said electrolyte and said graphene sheets contain single-layer graphene.

11. The internal hybrid electrochemical cell of claim 1, wherein said porphyrin complex is bonded to a primary surface of a graphene sheet.

12. The internal hybrid electrochemical cell of claim 1, wherein said lithium metal or lithium metal alloy is in a form of metal foil, film, particles, chips, or filaments and wherein said metal alloy contains no less than 80% by weight of lithium.

13. The internal hybrid electrochemical cell of claim 1, wherein said anode active material contains prelithiated particles of Si, Ge, SiO, Sn, SnO$_2$, or a combination thereof.

14. The internal hybrid electrochemical cell of claim 1, wherein said anode active material contains prelithiated particles of Si, Ge, SiO, Sn, SnO$_2$, or a combination thereof and said cathode active material contains a porphyrin complex bonded to a primary surface of a single-layer graphene sheet.

15. The internal hybrid electrochemical cell of claim 1, wherein said cathode further contains a resin binder that bonds graphene sheets together.

16. The internal hybrid electrochemical cell of claim 1, wherein said cathode further contains a conductive filler selected from graphite or carbon particles, carbon black, expanded graphite, graphene, carbon nanotube, carbon nanofiber, carbon fiber, conductive polymer, or a combination thereof.

17. The internal hybrid electrochemical cell of claim 1, wherein at least one of the anode and the cathode contains a current collector that is a porous, electrically conductive material selected from metal foam, metal web or screen, perforated metal sheet, metal fiber mat, metal nanowire mat, porous conductive polymer film, conductive polymer nanofiber mat or paper, conductive polymer foam, carbon foam, carbon aerogel, carbon xerogel, graphene foam, graphene oxide foam, reduced graphene oxide foam, carbon fiber paper, graphene paper, graphene oxide paper, reduced graphene oxide paper, carbon nanofiber paper, carbon nanotube paper, or a combination thereof.

18. The internal hybrid electrochemical cell of claim 1, wherein said anode active material contains prelithiated particles of Si, Ge, SiO, Sn, SnO$_2$, or a combination thereof and said prelithiated particles reside in pores of a porous, electrically conductive material selected from metal foam, metal web or screen, perforated metal sheet, metal fiber mat, metal nanowire mat, porous conductive polymer film, conductive polymer nanofiber mat or paper, conductive polymer foam, carbon foam, carbon aerogel, carbon xerogel, graphene foam, graphene oxide foam, reduced graphene oxide foam, carbon fiber paper, graphene paper, graphene oxide paper, reduced graphene oxide paper, carbon nanofiber paper, carbon nanotube paper, or a combination thereof.

19. The internal hybrid electrochemical cell of claim 1, wherein a discharge operation of said cell involves both lithium intercalation into an interior of said cathode active material and lithium adsorption on surfaces of said cathode active material.

20. The internal hybrid electrochemical cell of claim 1, wherein the electrolyte is organic liquid electrolyte, ionic liquid electrolyte, or gel electrolyte containing lithium ions when said cell is made.

21. An energy storage device comprising at least two internal hybrid electrochemical cells of claim 1 connected in series or in parallel.

22. An energy device comprising at least one internal hybrid electrochemical cell of claim 1, which is electrically connected to an electrochemical cell in series or in parallel.

* * * * *